United States Patent [19]
Zemel

[11] Patent Number: 5,891,289
[45] Date of Patent: Apr. 6, 1999

[54] METHOD OF TRANSFERRING METAL LEAF TO A SUBSTRATE

[76] Inventor: Richard S. Zemel, 1236 Harvey Rd., Knoxville, Tenn. 37922

[21] Appl. No.: 715,316

[22] Filed: Sep. 16, 1996

[51] Int. Cl.⁶ .................................................... B32B 31/00
[52] U.S. Cl. ........................... 156/235; 156/234; 156/289
[58] Field of Search .................................. 156/230, 235, 156/236, 233, 241, 234, 289

[56] References Cited

U.S. PATENT DOCUMENTS

| | | | |
|---|---|---|---|
| 1,124,869 | 1/1915 | Davis et al. . | |
| 3,340,121 | 9/1967 | Lawrenz | 156/233 |
| 3,458,376 | 7/1969 | Malik | 156/233 |
| 3,589,962 | 6/1971 | Bonjour | 156/233 |
| 4,012,552 | 3/1977 | Watts | 156/233 X |
| 4,142,929 | 3/1979 | Otomine et al. | 156/72 |
| 4,176,939 | 12/1979 | Shepherd | 427/208.6 X |
| 4,288,275 | 9/1981 | Davis | 156/233 X |
| 4,465,538 | 8/1984 | Schmoock | 156/233 |
| 4,685,984 | 8/1987 | Powers et al. | 156/155 |
| 4,810,320 | 3/1989 | Inagaki | 156/233 |
| 4,869,767 | 9/1989 | Robinson et al. | 156/233 |
| 4,994,131 | 2/1991 | Edwards | 156/233 |
| 5,133,819 | 7/1992 | Croner | 156/230 |
| 5,186,787 | 2/1993 | Phillips et al. | 156/631 |
| 5,306,374 | 4/1994 | Hambright | 156/247 |
| 5,383,996 | 1/1995 | Dressler | 156/234 |
| 5,487,927 | 1/1996 | Kamen et al. | 128/34.4 |
| 5,489,355 | 2/1996 | Shimizu et al. | 156/230 |
| 5,520,973 | 5/1996 | Kamen et al. | 428/35.7 |
| 5,603,259 | 2/1997 | Gross et al. | 156/233 X |

FOREIGN PATENT DOCUMENTS

| | | | |
|---|---|---|---|
| 1-93391 | 4/1989 | Japan | 156/233 |
| 1-145187 | 6/1989 | Japan | 156/233 |
| 4-38986 | 2/1992 | Japan . | |

*Primary Examiner*—Curtis Mayes
*Attorney, Agent, or Firm*—Sofer & Haroun, LLP

[57] ABSTRACT

A metal leaf adhesive transferring sheet is disclosed and includes a transfer sheet which is provided with a paper backing and a release layer. The release layer of the transfer sheet is coated with an adhesive. The adhesive may be transferred to a substrate by either burnishing an image on the first side of the transfer sheet or wetting the transfer sheet if a water release type release sheet is used. Thereafter, metal leaf may be applied to the adhesive image that is transferred to the substrate. A method of transferring metal leaf to a substrate is also disclosed.

13 Claims, 2 Drawing Sheets

METHOD OF TRANSFERRING METAL LEAF TO A SUBSTRATE

FIELD OF THE INVENTION

This invention relates to a transfer sheet having a release layer which is coated with an adhesive, and more particularly to a transfer sheet for transferring an adhesive image to a substrate so that metal leaf may be applied to the adhesive image as well as to a method of transferring metal leaf to a substrate utilizing the transfer sheet.

BACKGROUND OF THE INVENTION

As described in U.S. patent application Ser. No. 08/707, 061, to Zemel, entitled "METHOD OF TRANSFERRING METAL LEAF TO A SUBSTRATE" filed Sep. 3, 1996, the disclosure of which is hereby fully incorporated by reference, transfer size is used in the process of high quality leafing, such as gold leaf, bronze leaf or other forms of metal leaf, upon a substrate. Gold leaf, for instance, has been traditionally applied to interior and exterior surfaces by first applying a substance known as transfer size directly on a surface. Conventional transfer size is a sticky gluelike substance which can either be purchased or manufactured by the person performing the metal leafing. Transfer size is traditionally available in a slow type and a fast type. The difference between slow and fast size is the period of time necessary for the size to become tacky or to attain a desired stickiness. Fast size become tacky very quickly, but has a short "open" time or time during which it retains its stickiness. Slow size takes longer to become tacky but has a longer "open" time depending on the formulation of the size. Both fast and slow size are, however, are applied as a wet substance which may be extremely messy. Transfer size is also available as an aerosol spray and generally tacks quickly. Spray transfer size may, however, run after sprayed upon the desired surface.

Size must be first applied wherever one would want to apply metal leaf. The size may be stenciled or painted on an object of substrate that is to receive the metal leaf. Generally, size is applied in register over an undercolor which gives character to the final leafing. However, the undercolor is often not visible because of the wetness of the size or the formulation of which it is composed. When the size is applied to an object or substrate and reaches the proper tack, the metal leaf is gently lowered on to the tacky size and very carefully smoothed over. A brush or fabric is then moved back and forth over the leaf such that the abrasive action causes the leaf not attached to the size to break away leaving, the areas coated in size to be metal leafed. Producing fine details using this method is, however, extremely difficult, time consuming, and requires a skilled artisan. Additionally, the chemicals and solvents used in the size formulation can be flammable and hazardous if used in a closed area, and in addition, may be harmful to the environment.

Accordingly, there is a need for a transfer sheet having a layer of adhesive that may be transferred to a substrate in a desired form which is dry, clean, safe for both users and the environment, and which can then have metal leaf applied thereto. Additionally, there is a need for an adhesive transfer sheet which is easy to prepare and which can be used by an individual with little or no training in the art of metal leafing.

OBJECTS AND SUMMARY OF THE INVENTION

It is thus a general object of the present invention to provide a metal leaf transfer size which is safe to use by a user as well as safe for the environment, and which permits high quality metal leafing by all individuals.

A more specific object of the present invention is to provide a transfer size which is dry and eliminates the need for application of a wet or spray size prior to applying metal leaf to a desired surface.

An additional object of the present invention is to provide an adhesive transfer sheet for facilitating the transfer of adhesive to a substrate to which metal leaf is then applied.

An additional object is to eliminate the use of graphic stencils which must be cut out or fabricated in order to apply wet or spray size in the desired areas.

A further object is to eliminate the hand painting of wet or spray size on a desired surface.

It is a further object of the present invention to provide a dry transfer size which is clear in color and which permits the addition of colored pigment for providing back up color.

It is still a further object of the present invention to provide a dry transfer size which is clear in color and which permits viewing of an undercolor on the substrate or surface to which the size is applied.

In accordance with one aspect of the present invention, a transfer sheet having a release layer is provided. An adhesive coating is applied to the release layer side of the transfer sheet and permitted to dry. In order to transfer the adhesive from the adhesive transfer sheet to the substrate, a specific design or image is drawn on the first side of the adhesive transfer sheet, the side opposite the release layer, when the adhesive coated transfer sheet is placed in the desired area of the substrate. By applying pressure by any appropriate instrument or tool, to the first side of the adhesive transfer sheet, the affinity of the release layer, the wax content, allows the adhesive on the second side of the adhesive transfer sheet to transfer to the substrate. Thereafter, once the outlining of the design is completed, the remaining areas of the design or image on the first side of the transfer sheet is burnished or rubbed so as to transfer the adhesive from the second side to the substrate. In this way, adhesive coatings in the shape of the desired design is transferred to the substrate. Thereafter, the adhesive transfer sheet is removed from the substrate, thus allowing the transferred adhesive in the shape of the desired design to be exposed. If a water release transfer paper is use, the back of the release paper is wet with water. After approximately one minute, the release paper is removed and the adhesive size which remains is allowed to dry. Metal leaf such as gold or bronze leaf or any other finely ground powder, pigment or even flock may then be applied in the traditional manner to the adhesive which is on the substrate.

In another aspect of the invention, a method of transferring metal leaf is provided which eliminates the need in the prior art for a wet or spray size to be applied prior to applying metal leaf to a substrate. The method of transferring metal leaf to a substrate according to the present invention, includes the steps of first creating an adhesive transfer sheet by utilizing a transfer sheet having a release layer, such as a dry or wet release sheet, and coating the release layer with an adhesive coating. Once the release layer on the transfer sheet is coated with adhesive it is permitted to dry. A desired image, design, letters or words, are sketched or drawn upon the paper backing side of the transfer sheet. The desired design or image is easily drawn, printed by computer or written on to the paper backing by the individual performing the leafing, or alternatively may be drawn or written by a skilled artisan. In this way, premade stencils may be fabricated in order to transfer adhesive in a prearranged image so that metal leaf may be applied. Use of the pressure sensitive adhesive is environmentally safe, and does not contain harmful or flammable solvents or chemicals. The adhesive coated second side of the transfer sheet is then placed upon the desired substrate. Depending of the type of transfer paper utilized, by using a burnisher, the image, design, letters or words on the paper backing side of the transfer sheet are rubbed to effect the transfer of the adhesive to the substrate. The transfer sheet is then peeled away leaving adhesive upon the substrate in the configuration of the image, design, letters or words. Metal leaf, such as gold leaf or bronze leaf may then be applied in the traditional manner to the adhesive on the substrate.

In an further alternative embodiment, a translucent transfer sheet may be used for transferring adhesive around an existing design or words on a substrate to effect a repair of the metal leafing. To leaf an area around an existing image, design or words, the adhesive transfer sheet is placed upon the substrate or surface over the existing image or words. As the transfer sheet is translucent, a pencil or any other writing implement is then used to burnish and transfer adhesive around the existing image design or words to be leafed. Once the adhesive is transferred, the transfer sheet is then peeled away to leave adhesive upon the substrate in the area surrounding the image, design or words. Metal leaf, such as gold leaf or bronze leaf may then be applied in the traditional manner to the adhesive on the substrate.

The above description sets forth rather broadly the more important features of the present invention in order that the detailed description thereof that follows may be understood, and in order that the present contributions to the art may be better appreciated. Other objects and features of the present invention will become apparent from the following detailed description considered in conjunction with the accompanying figures. It is to be understood, however, that the figures are designed solely for the purposes of illustration and not as a definition of the limits of the invention for which reference should be made to the appended claims.

DETAILED DESCRIPTION OF THE DRAWINGS

In the figures in which like reference characters denote similar elements throughout the several views.

DETAILED DESCRIPTION OF THE PRESENTLY PREFERRED EMBODIMENT

Figure 1:
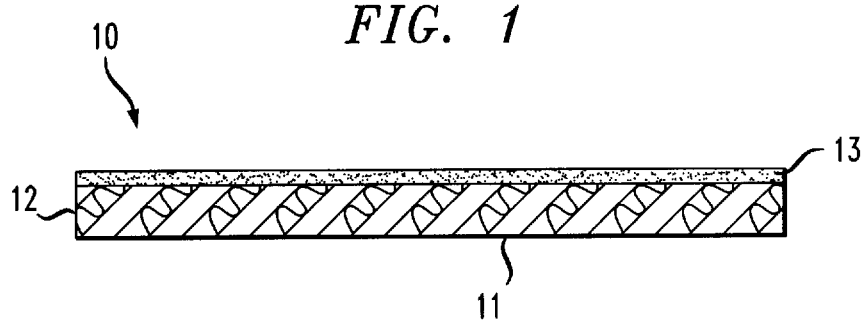
FIG. 1 illustrates a transverse sectional view of a first embodiment of a transfer sheet having a paper backing and release layer according to the present invention.
Figure 2:
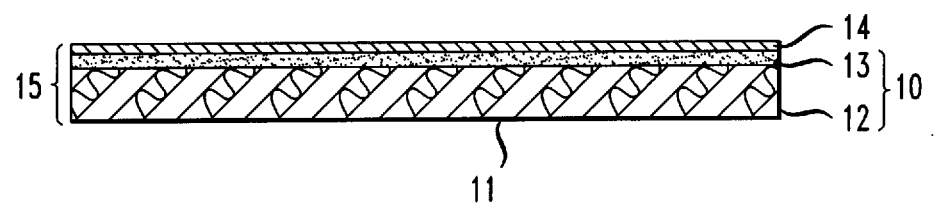
FIG. 2 illustrates a transverse sectional view of the transfer sheet of FIG. 1 having a layer of adhesive deposited upon one side of the transfer sheet.
Figure 3:
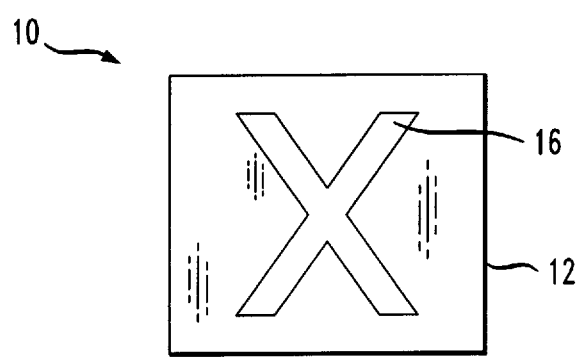
FIG. 3 illustrates a frontal view of a transfer sheet having an design drawn upon one side of the paper backing side of the transfer sheet.
Figure 4:
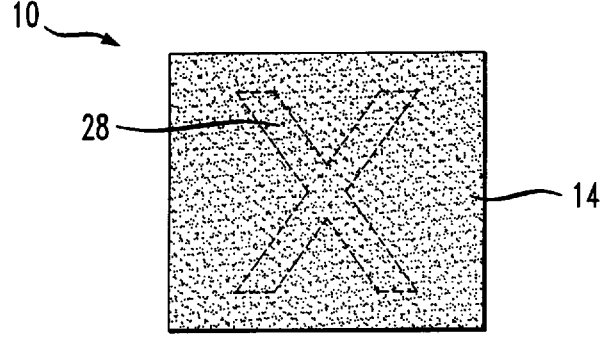
FIG. 4 illustrates a frontal view of the reverse side of the transfer sheet illustrated in FIG. 3, and having a coat of adhesive deposited upon the paper.
Figure 5B:
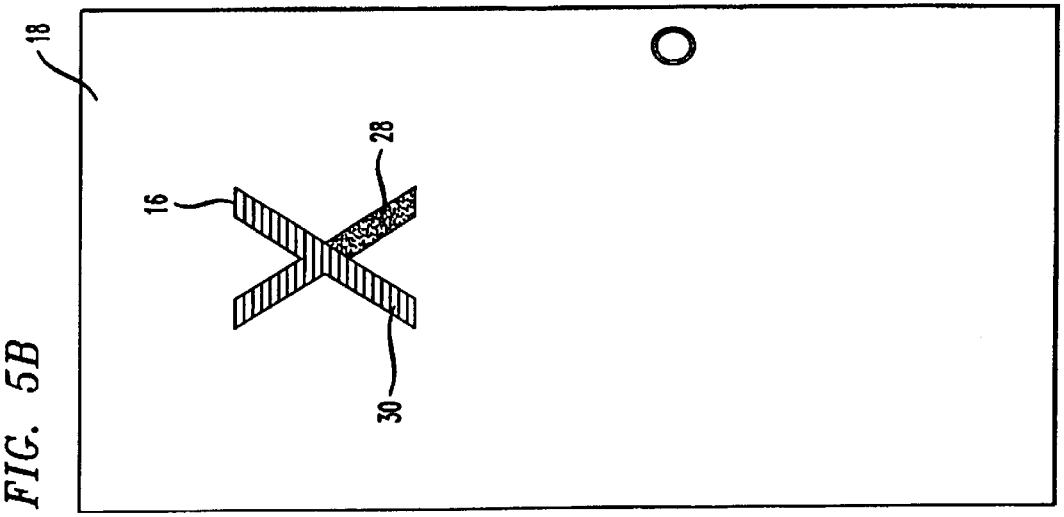
FIGS. 5A and 5B illustrate a schematic illustration of the preferred process for transferring a design on a transfer sheet as in FIG. 3, to a substrate in order to apply metal leafing according to the present invention.
Figure 5A:
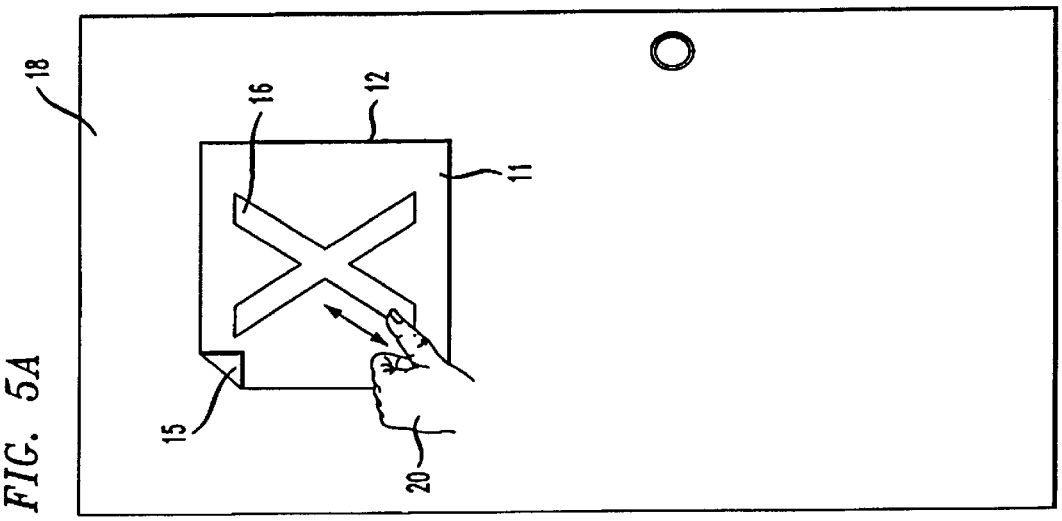

With initial reference to FIGS. 1 and 2, there is shown one embodiment of the transfer sheet 10 according to the present invention. Transfer sheet 10 includes a backing surface 12, which is preferably a paper backing, although any suitable backing material may be used, and a release layer 13 provided on one slide of the backing surface 12.

As shown in FIG. 2, release layer 13 is coated by any suitable manner, e.g., brush, roller, air sprayer, coating rod, etc. with adhesive 14 which is preferably an automotive pressure sensitive adhesive such as ESPS 500, manufactured by Electrocal, S. Windsor, Conn. 06074. However, the invention is not limited in either of these respects and specifically other contact adhesives may be used. Adhesive 14 is preferably thinned up to 20% with water and is clear in color. Advantageously, the pressure sensitive adhesive 14 may be colored with water soluble pigments to provide a backup color for use in the later addition of metal leaf as well as to ensure that the adhesive is visible on various surfaces. Transfer sheet 10 is preferably any dry transfer sheet known in the art such as Chromaslick brand release paper from Chromotek Inc., 196 Wicksteed Ave., Toronto, Ontario M4G 286. As an alternative, a water release decal type transfer sheet such as Twincal and Photocal manufactured by Brittains T. R. Limited—Ivy House Paper Mills, Commercial Road, Hanley, Stakeon-Tret ST1 3QS, England, and described in U.S. application Ser. No. 08/654,448 to Zemel filed May 28, 1996, now abandoned, the disclosure of which is also incorporated herein by reference, may be used instead of a dry transfer sheet 10. As a further alternative, a parchment release paper distributed by Trans Art Supplies, Toronto, Canada may also be utilized.

With reference to FIGS. 3, 4 and 5A, 5B, in order to transfer the adhesive 14 in the area 28 on the opposite side of design 16 from the transfer sheet 10 to the substrate 18, the adhesive transfer sheet 15 is placed in the desired area of the substrate 18. Once in the desired location, by applying pressure by any suitable tool or instrument including a thumb nail 20 to the first side 11 of the adhesive transfer sheet 15, and thus activating the release layer 13, the adhesive 14 is transferred to the substrate 18. Thereafter, once the outlining of the design 16 is completed, the remaining areas of the design 16 on the first side 11 of the adhesive transfer sheet 15 is burnished or rubbed so as to transfer the adhesive 14 from the second side to the substrate 18. In this way, adhesive coating in the shape of the desired design 16 is transferred to the substrate 18. Thereafter, the adhesive transfer sheet 15 is removed from the substrate 18, thus allowing the transferred adhesive 28 in the shape of the desired design 16 to be exposed. If a water release transfer paper is used, the release paper is activated when wet with water. After approximately one minute, the release paper is removed and the adhesive size 14 which remains on the substrate is allowed to dry. In this way, the user need only burnish the design in a desired place on the substrate 18. Thereafter, in either of these embodiments, metal leaf (not shown) such as gold or bronze leaf or any other finely ground powder, pigment or even flock may then be applied in the traditional manner to the transferred adhesive 28 which is transferred from the adhesive transfer sheet 15 to the substrate 18.

In another aspect of the invention, a method of transferring metal leaf is provided which eliminates the need in the prior art for a wet or spray size to be applied prior to applying metal leaf to a substrate. The method of transferring metal leaf to substrate 18 according to the present invention, includes the steps of first providing a transfer sheet 10 having a paper backing 12, a release layer 13 formed on one side of the paper backing 12 and an adhesive coating layer 14 deposited on the release layer 13. Once the release layer 13 on the transfer sheet 10 is coated with adhesive 14, it is permitted to dry. A desired image, design, letters or words, 16 are sketched or drawn upon the paper backing side 11 of the transfer sheet 10. The desired design or image 16 is easily drawn, printed by computer or written on to the paper backing by the individual performing the leafing, or alternatively may be drawn or written by a skilled artisan. In this way, premade stencils may be fabricated in order to transfer adhesive 14 in a prearranged image so that metal leaf may be applied. Use of the pressure sensitive adhesive is environmentally safe, and does not contain harmful or flammable solvents or chemicals. The adhesive coated side of the adhesive transfer sheet 15 is then placed upon the desired substrate 18. Depending on the type of transfer paper utilized, by using a burnisher, the image, design, letters or words 16 on the paper backing side 11 of the transfer sheet 10 are rubbed to effect the transfer of the adhesive design 16 to the substrate. The transfer sheet 15 is then peeled away leaving an adhesive design 16 upon the substrate 18 in the configuration of the image, design, letters or words. Metal leaf 30, such as gold leaf or bronze leaf may then be applied in the traditional manner to the adhesive on the substrate.

In an further alternative embodiment, the transfer sheet 12 may be translucent so that adhesive 14 may be transferred around an existing design or words on a substrate 18. To leaf an area around an existing image, design or words, the adhesive transfer sheet 15 is placed upon the substrate or surface over the existing image or words. As the adhesive transfer sheet 15 is translucent, a pencil or any other writing implement is then used to burnish and transfer adhesive 14 around the existing image, design or words. Once the adhesive is transferred, the adhesive transfer sheet 15 is then peeled away to leave adhesive 14 upon the substrate 18 in the area surrounding the image design or words. Metal leaf 30, such as gold leaf or bronze leaf may then be applied in the traditional manner to the adhesive 14 on the substrate 18.

Thus, while there have been shown and described and pointed out fundamental novel features of the invention as applied to preferred embodiments thereof, it will be understood that various omissions and substitutes and changes in the form and details of the disclosed invention may be made by those skilled in the art without departing from the spirit of the invention. It is the intention, therefore, to be limited only as indicated by the scope of the claims appended hereto. It is to be understood that the figures are not necessarily drawn to scale, but that they are merely conceptual in nature.

What is claimed is:

1. A method of transferring adhesive to a substrate, comprising the steps of:

providing a transfer sheet having a paper backing, said paper backing having first and second sides, a release layer formed on said second side and an adhesive coating layer deposited on said release layer;

placing said transfer sheet on the substrate;

burnishing said first side of said paper backing so that said adhesive coating in the shape of an image is transferred to the substrate;

removing said transfer sheet from the substrate, said transfer sheet having said adhesive coating layer where said first side is not burnished; and applying metal leaf to said transferred adhesive coating to create a metal leaf image.

2. The method of transferring adhesive to a substrate to be metal leafed according to claim 1, wherein said adhesive is a pressure sensitive adhesive.

3. The method of transferring adhesive to a substrate to be metal leafed according to claim 2, wherein said pressure sensitive adhesive is an automotive adhesive.

4. The method of transferring adhesive to a substrate to be metal leafed according to claim 2, wherein said pressure sensitive adhesive is thinned up to 20 percent with water, and wherein said pressure sensitive adhesive is clear in color.

5. The method of transferring adhesive to a substrate to be metal leafed according to claim 2, wherein said pressure sensitive adhesive is colored with water soluble pigments.

6. The method of transferring adhesive to a substrate to be metal leafed according to claim 1, wherein said metal leaf is gold leaf.

7. The method of transferring adhesive to a substrate to be metal leafed according to claim 1, wherein said metal leaf is a bronze leaf.

8. The method of transferring adhesive to a substrate to be metal leafed according to claim 1, wherein said transfer sheet is a dry transfer sheet.

9. The method of transferring adhesive to a substrate to be metal leafed according to claim 1, wherein said transfer sheet is a water release decal type transfer sheet.

10. The method of transferring adhesive to a substrate to be metal leafed according to claim 1, wherein said transfer sheet is translucent.

11. The method of transferring adhesive to a substrate to be metal leafed according to claim 1, wherein said transfer sheet is a parchment release paper.

12. The method of transferring adhesive to a substrate to be metal leafed according to claim 1, wherein after said providing step an image is sketched upon said paper backing side of said transfer sheet.

13. The method of transferring adhesive to a substrate to be metal leafed according to claim 12, wherein said image is prepared by a computer.

* * * * *